US012779736B2

(12) United States Patent
Guzik et al.

(10) Patent No.: US 12,779,736 B2
(45) Date of Patent: Nov. 3, 2026

(54) METHOD FOR INCREASING THE SPHERICITY OF GRAINS OF THERMOPLASTIC POLYMER POWDERS

(71) Applicant: ALPHA POWDERS SP. Z O.O., Warsaw (PL)

(72) Inventors: Aleksander Guzik, Cracow (PL); Dominik Antoni Zdybal, Cracow (PL)

(73) Assignee: ALPHA POWDERS SP. ZO.O, Warsaw (PL)

( * ) Notice: Subject to any disclaimer, the term of this patent is extended or adjusted under 35 U.S.C. 154(b) by 60 days.

(21) Appl. No.: 18/708,743

(22) PCT Filed: Nov. 10, 2022

(86) PCT No.: PCT/IB2022/060807
§ 371 (c)(1),
(2) Date: May 9, 2024

(87) PCT Pub. No.: WO2023/084426
PCT Pub. Date: May 19, 2023

(65) Prior Publication Data

US 2024/0335807 A1 Oct. 10, 2024

(30) Foreign Application Priority Data

Nov. 10, 2021 (PL) ........................................ 439486

(51) Int. Cl.
*B29B 9/16* (2006.01)
*B01J 2/04* (2006.01)
(Continued)

(52) U.S. Cl.
CPC .................. *B29B 9/16* (2013.01); *B01J 2/04* (2013.01); *B01J 2/16* (2013.01); *B29B 13/021* (2013.01);
(Continued)

(58) Field of Classification Search
CPC ... B29B 9/16; B29B 2009/166; B29B 13/021; B29B 13/022; B29B 13/08
(Continued)

(56) References Cited

U.S. PATENT DOCUMENTS 3,471,267 A * 10/1969 Sutherland ................ B01J 2/12
23/313 R
3,971,749 A 7/1976 Blunt
(Continued)

FOREIGN PATENT DOCUMENTS

CA 2667890 A1 * 5/2008 ................ C08J 3/12
CN 108501250 A * 9/2018 ................ B29B 9/10
(Continued)

OTHER PUBLICATIONS

Machine translation of WO-03054063-A1, retrieved from USPTO database Feb. 18, 2026 (Year: 2026).*
(Continued)

*Primary Examiner* — Timothy Kennedy
(74) *Attorney, Agent, or Firm* — Thomas Horstemeyer LLP

(57) ABSTRACT

A method of increasing the sphericity and roundness of thermoplastic polymer powders, characterized in that the powder grains are first introduced, in a stream of gas, into a device ensuring the breakup of powder agglomerates, then, optionally, the powder is transported to a device ensuring the conditions close to a free fall, then the powder is transported via a nozzle into an optically transparent flow chamber placed within a zone covered by radiation coming from a radiation source, then the powder is allowed to absorb the radiation and the powder is allowed to melt, then the powder is removed from the radiation zone by a carrier gas, then the melted powder grains are allowed to undergo controlled crystallization inside a controlled crystallization chamber.

22 Claims, 3 Drawing Sheets

Arrangement 1

Arrangement 2

(51) Int. Cl.
*B01J 2/16* (2006.01)
*B29B 13/02* (2006.01)
*B29B 13/08* (2006.01)

(52) U.S. Cl.
CPC ............ *B29B 13/022* (2013.01); *B29B 13/08* (2013.01); *B29B 2009/166* (2013.01)

(58) Field of Classification Search
USPC ............................................................ 264/15
See application file for complete search history.

(56) References Cited

U.S. PATENT DOCUMENTS

| | | | | |
|---|---|---|---|---|
| 4,017,290 | A * | 4/1977 | Budrick | C03B 19/1075 264/43 |
| 4,076,640 | A * | 2/1978 | Forgensi | C04B 35/653 427/127 |
| 4,345,015 | A | 8/1982 | Hendriksma et al. | |
| 4,783,214 | A * | 11/1988 | Kemp, Jr. | B22F 1/065 75/252 |
| 4,915,987 | A * | 4/1990 | Nara | B01F 35/71731 427/195 |
| 5,124,100 | A * | 6/1992 | Nishii | B29B 9/08 264/117 |
| 5,932,687 | A | 8/1999 | Baumann et al. | |
| 6,264,861 | B1 | 7/2001 | Tavernier et al. | |
| 2007/0274789 | A1 * | 11/2007 | DeBruin | C08G 63/88 406/197 |
| 2012/0070666 | A1 | 3/2012 | Gersch et al. | |
| 2014/0096409 | A1 * | 4/2014 | Ohtsu | G03G 9/0819 34/582 |
| 2016/0221084 | A1 * | 8/2016 | Klecka | B22F 1/142 |
| 2017/0144330 | A1 * | 5/2017 | Ortega Andrade | E21B 43/267 |
| 2020/0062892 | A1 | 2/2020 | Asahara et al. | |
| 2020/0109238 | A1 * | 4/2020 | Ito | C08G 63/88 |
| 2022/0332911 | A1 * | 10/2022 | Bai | B02C 7/08 |
| 2022/0380557 | A1 | 12/2022 | Morimitsu et al. | |
| 2023/0219823 | A1 * | 7/2023 | Nakamura | C01F 7/025 423/625 |

FOREIGN PATENT DOCUMENTS

| | | | | |
|---|---|---|---|---|
| CN | 110052618 | A * | 7/2019 | B29B 9/12 |
| DE | 102006015791 | A1 | 10/2007 | |
| EP | 0555947 | A1 | 8/1993 | |
| EP | 1847559 | B1 | 10/2007 | |
| WO | WO-03054063 | A1 * | 7/2003 | C08J 3/12 |
| WO | 2016071817 | A2 | 5/2016 | |
| WO | 2017140773 | A1 | 8/2017 | |
| WO | 2023016848 | A1 | 2/2023 | |

OTHER PUBLICATIONS

Machine translation of CN-108501250-A, retrieved from USPTO database Feb. 18, 2026 (Year: 2026).*

Machine translation of CN-110052618-A, retrieved from USPTO database Feb. 18, 2026 (Year: 2026).*

JXT Technology, Understanding Quartz Glass Types: JGS1, JGS2, and JGS3, Aug. 11, 2025, https://jxtwafer.com/about/blogs/1255.html (Year: 2025).*

Ying Zhou. "Preparation of near-spherical PA12 particles for selective laser sintering via Plateau-Rayleigh instability of molten fibers". ScienceDirect. Materials and Design 190 (2020).

Marius Sachs. "Rounding of Irregular Polymer Particles in a Downer Reactor". ScienceDirect. Procedia Engineering 102 (2015).

Nicolas Mys. "Processing of Polysulfone to Free Flowing Powder by Mechanical Milling and Spray Drying Techniques for Use in Selective Laser Sintering". Polymers (2016).

Prakhyat Hejmady. "A processing route to spherical polymer particles via controlled droplet retraction". Powder Technology 388 (2021).

Juan Sebastian Gomez Bonilla, "Thermal rounding of micron-sized polymer particles in a downer reactor: direct vs indirect heating". Rapid Prototyping Journal. vol. 26 • No. 9 • 2020 • 1637-1646.

Marius Sachs. "Characterization of a downer reactor for particle rounding". Powder Technology (2017). DOI: 10.1016/j.powtec.2017.01.006.

Xinshuang Yang. "Preparation of spherical polymer powders for selective laser sintering from immiscible PA12/PEO blends with high viscosity ratios". Polymer 172 (2019).

* cited by examiner

METHOD FOR INCREASING THE SPHERICITY OF GRAINS OF THERMOPLASTIC POLYMER POWDERS

The object of the present invention is a method of increasing the sphericity of grains of thermoplastic polymer powders. The term "sphericity" as used in the present description, should also be understood as "ovality", "roundness", "regularity". The term "grains" of the polymer powder as used in this description, should also be understood as "particles" of the polymer powder. The term "type-II phase transition" as used in this description, should also be understood as "second-order phase transition" or "glass transition". The term "spontaneous spheroidization," as used in this description, is to be understood as a process of spontaneous change of shape of an arbitrarily-shaped particle, into a near-perfect sphere; the particle being a droplet of liquid polymer suspended in a fluid under the negligible influence of Earth's gravity, the process being controlled mainly by the surface tension, viscosity and the size of the liquid polymer droplet.

Powders of thermoplastic polymers, both crystalline ones showing a melting point and amorphous ones showing a type-II phase transition, are used as components of powder paints, electrostatically applied paints, electrostatically applied layers from solutions and suspensions (EPD—Electrophoretic Deposition), feed materials for rotomolding processes, in additive manufacturing technologies as feedstock materials for the Selective Laser Sintering (SLS) process, in additive manufacturing technologies as feedstock materials for the Multi Jet Fusion (MJF) process, abrasive materials for cosmetic applications, materials for the Polymer Cold Spray process or feedstock materials for the Polymer Flame Spray (FSA) process, or in the production of toners and inks. Particularly, in additive manufacturing technologies such as SLS or MJF, it is required that the powders be characterized by high sphericity, which enables efficient transport processes and good consolidation at high temperatures. This is possible due to the high flowability of the powders (expressed by the Hausner ratio), which is positively correlated with the sphericity of the polymer grains. Many methods of producing polymer powders based on milling processes, including milling under cryogenic conditions, lead to irregular powders with low sphericity, resulting in low flowability, which in turn significantly limits their use in additive manufacturing techniques and other fields requiring high flowability.

Commonly known methods of obtaining powders with highly spherical grains of thermoplastic polymers can be categorized with respect to the mechanism of action, namely: controlled melting, spontaneous spheroidization, controlled crystallization and controlled precipitation from solution. Those methods utilize the aforementioned mechanisms in conjunction with the heat transfer by convection in liquids or gasses. One well-known method is the preparation of powders with a high sphericity parameter by precipitation of the polymer from solution, where the precipitation process is caused by either lowering the temperature or adding a liquid that is a non-solvent of the polymer. This process is used for polyamide 12 (PA12), polypropylene (PP), polyamide 6 (PA6), polycarbonate (PC), polyamide 11 (PA11), polybutylene terephthalate (PBT), polyoxymethylene (POM) and polylactide derivatives (PLA). This method is characterized by the need to use toxic solvents and the need for rigorous selection of process conditions in pressure reactors, which is unfavorable. An example summary of known applications of this method is presented in the paper (P. Hejmady et al, A processing route to spherical polymer particles via controlled droplet retraction, 388, 401-411, 2021). Moreover, the U.S. Pat. No. 5,932,687A describes an invention where a polyamide 12-based material is precipitated in a controlled manner from an aliphatic alcohol containing 1 to 13 carbon atoms, at a temperature in the range 130° C. to 165° C. in a high-pressure system, with subsequent cooling to a temperature from 110° C. to 130° C. Another commonly known method is the spray drying process. The spray drying process can be used for a wide range of thermoplastic polymers, including high melting point polymers such as polysulfone (PSU). The main limitation of this method is the low mass yield and the difficulty in selecting the optimal chamber temperature, as well as the excessive consolidation of particles in the collecting vessel. Another well-known process is co-extrusion of the thermoplastic material with a matrix material, where the matrix material can be subsequently removed, leaving behind the thermoplastic grains with high sphericity. This solution is disadvantageous, due to the necessity of removing and managing the waste polymer matrix, as well as the fact of poor control over the particle size distribution. This solution is known to be used for polypropylene, and polyamide 12. Exemplary results described in (X. Yang et al., Preparation of spherical polymer powders for selective laser sintering from immiscible PA12/PEO blends with high viscosity ratios, Polymer, 172, 58-65, 2019), indicate the formation of a fraction with a sieve size of less than 1 micrometer, which is undesirable for applications in additive manufacturing technologies or applications where the risk of inhalation or ingestion of the powder material by humans is present. In a patent application DE102006015791A1, water-soluble matrices based on poly(ethylene glycol) and poly(ethylene oxide) are described. There is a well-known method, described in the scientific literature, allowing the transformation of a thermoplastic polymer fiber into spherical grains by controlled heating in a liquid matrix, taking advantage of the Plateau-Rayleigh effect. This method is described, for instance, in the publication (Y. Zhou et al., Preparation of near-spherical PA12 particles for selective laser sintering via Plateau-Rayleigh instability of molten fibers, Materials and Design, 190, 108578, 2020). It is limited in terms of efficiency, as it inherently generates a very fine fraction, and also negatively affects the purity of the resulting powder and may lead to its degradation due to excessive exposure to high temperatures. Another known method is described in the patent application U.S. Pat. No. 4,345,015A, which involves the heating of polymer particles suspended in a liquid that is a non-solvent of the polymer. This method is characterized by the necessity of cleaning the powder grains from the liquid residue, which is a disadvantage of the method. Another known method is described in the U.S. Pat. No. 6,264,861 B1 patent application, where irregular grains of a thermoplastic polymer are homogenized with grains of a non-thermoplastic material and subjected to mixing at a temperature above the glass transition temperature of the thermoplastic polymer undergoing spheroidization. This solution is inferior, because of the need to separate the non-thermoplastic material after the grain rounding process, making it unattractive for high-purity, low-cost powder applications. Other methods are known that involve the heating of a suspension of thermoplastic polymer powder particles in a gas through tube reactor heaters. One such solution, existing in the scientific and industry literature under the name 'Heated Downer Reactor', is exemplified in (M. Sachs et al., Characterization of a downer reactor for particle rounding, Powder Technology, 316, 1, 357-366, 2017). The method can be used for polystyrene powders, PBT powders, polyethylene (PE) powders and other thermoplastics. Despite the significant size of the device, the solution is characterized by a low efficiency of the process around 70%, caused by the uncontrolled deposition of molten thermoplastic particles on the walls of the reactor, near the inlet of the powder lift gas. The method has a production capacity of around 200 g/h of powder. Due to the height of the tubular reactor exceeding 4 meters, the solution is not easily scalable, which would be required to achieve favorable production capacities, taking into consideration that a large portion of the feed powder is destroyed during the process. Another known solution described in the patent application US20120070666A1 is the use of NARA's NHS device that provides high shear forces acting on powder grains, where the powder is introduced at a temperature above the glass transition temperature but below the melting point of the material.

During the course of the research, it was unexpectedly found that infrared radiation is not only scattered but also partially absorbed by the suspension of the polymer powder particles in gas. It was observed that, when the thermoplastic polymer powder grains contain infrared-absorbing additives, it is possible to accelerate the heating process and reach a complete melting or a complete type-II phase transition of the particles. It was observed that even when the powder particles do not contain an infrared absorbing additive, it is still possible to carry out the process, which proceeds with a reduced mass efficiency, and is based on the absorption of infrared radiation by the polymer. It was observed that regardless of whether the particles contain the radiation-absorbing additive or not, the spheroidization process proceeds with both a radiation absorption mechanism and a convection heating mechanism. It was observed that when the powder particles are above the room temperature and at the same time 20° C. below the melting point of the thermoplastic polymer, it is possible to effectively melt the particles in the gas phase through the mechanism of radiation absorption, while maintaining no agglomeration of the thermoplastic polymer powder in the ejector and the feeding nozzle. It was observed that when powder particles are introduced into the reactor while the gas temperature near the entrance to the reactor is in the range from room temperature to the melting point of the polymer, it is possible to melt the powder particles efficiently via a mixed mechanism of radiation absorption and convective heating. It was observed that when the powder particles are introduced into the reactor, while the temperature of the gas near the entrance to the reactor is in the range from room temperature to the melting point of the polymer, it is possible to efficiently melt the powder particles via a mixed mechanism of radiation absorption and convective heating, particularly when the radiation heating zone and the convective heating zone are located in the same place; a situation advantageously realized by implementing a reactor made of a material that is partially transparent to radiation and has a low thermal conductivity coefficient. In the course of the research, it was found that the method of spheroidization by radiation is effective if the grains of the polymer powder do not remain in an agglomerated state. Otherwise, the spheroidization proceeds along with an increase of the average particle size. It was observed that a convenient method of feeding the powder into the process is by using a venturi ejector, powdered by a shielding gas, with the powder being dispensed into the suction section of the ejector by the use of one of the well-known methods that are not a part of the present invention. It was observed that an advantageous method of feeding the powder is in conditions close to a free fall, in particular feeding through a sieve, an arrangement of multiple sieves or an arrangement based on a sieve or sieves and powder agglomerate-breaking elements. It was observed that an advantageous method of feeding the powder is in conditions close to a free fall, in particular feeding through a sieve, an arrangement of multiple sieves or an arrangement based on a sieve or sieves and powder agglomerate-breaking elements, wherein the flow of powder and the shielding gas are controlled by lowering of the pressure near the outlet of the reactor section, thereby causing the shielding gas and the polymer powder to be drawn into the reactor simultaneously. In the course of research, it was observed that in order to avoid consolidation of the molten grains, the invention should include the step of controlled crystallization of the molten grains after exiting the transparent chamber in which the heating by radiation takes place, advantageously the controlled crystallization takes place in a chemically inert shielding gas with a temperature ranging from the room temperature to 50° C. below the melting point of the thermoplastic powder.

The object of the invention is visualized in the attached drawing, in which

Figure 1:
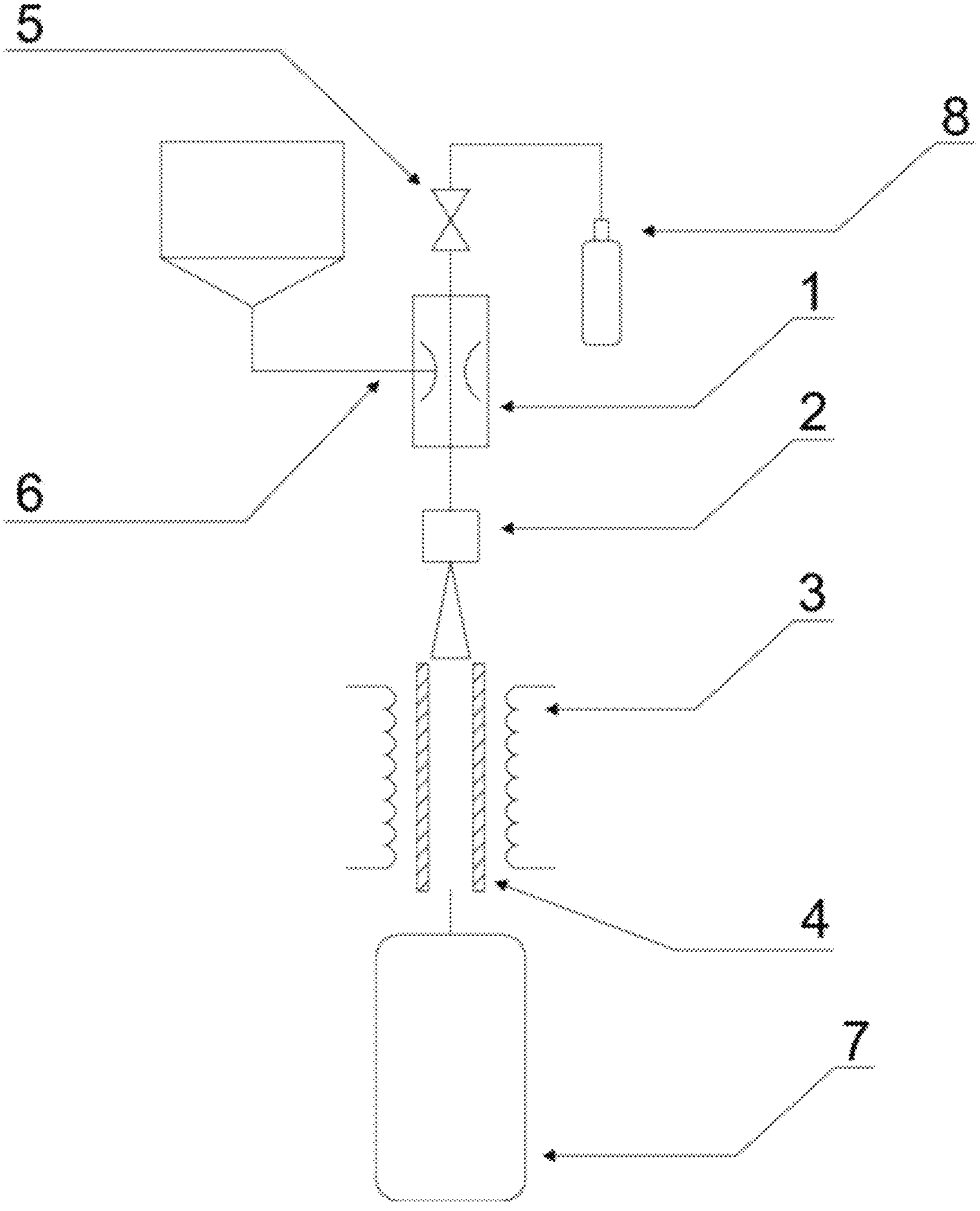
FIG. 1 shows a schematic diagram of spheroidization of thermoplastic polymer powder.
Figure 2:
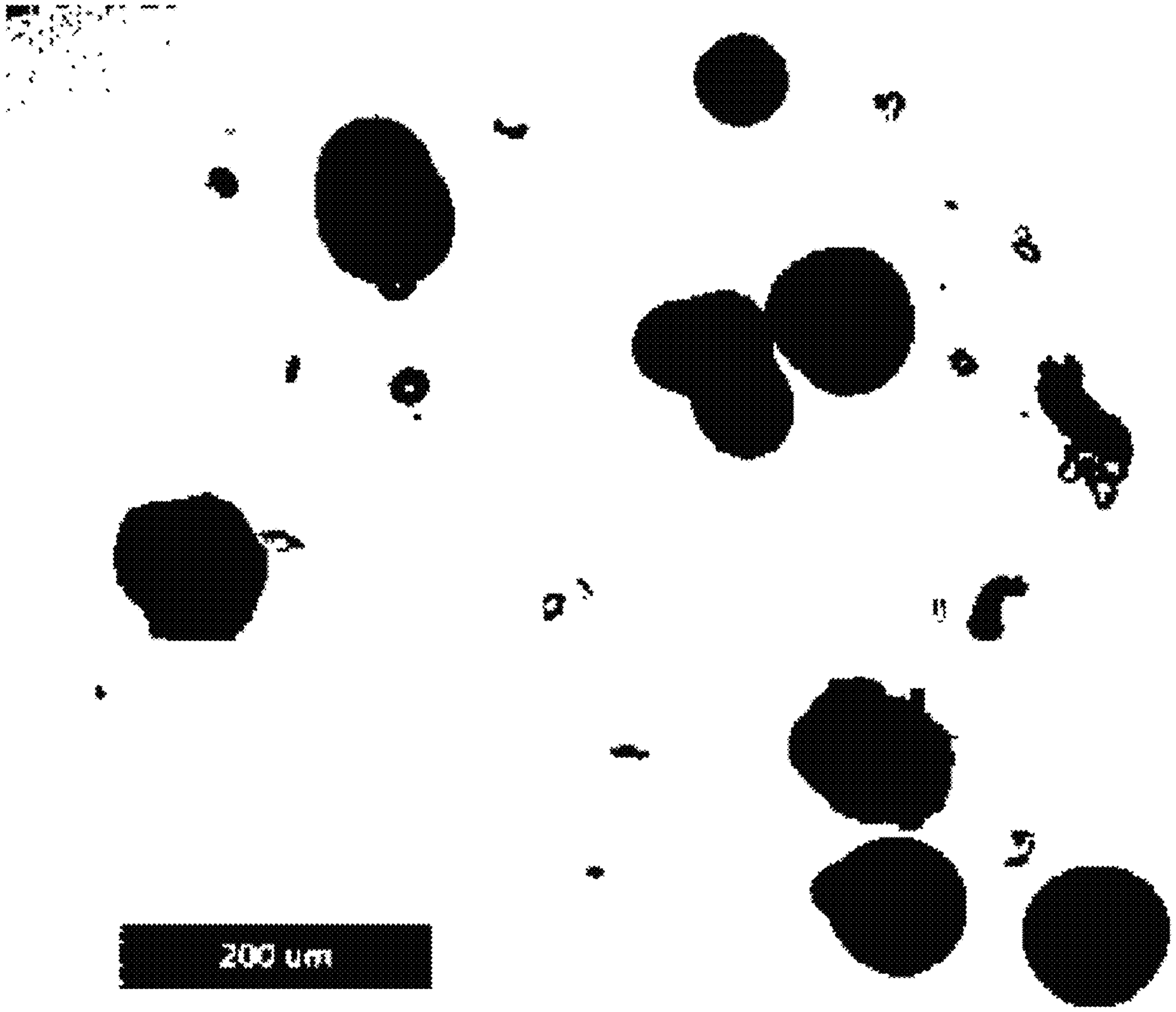
FIG. 2 shows the grains of the thermoplastic polymer subjected to the spheroidization process according to Example 1.
Figure 3:
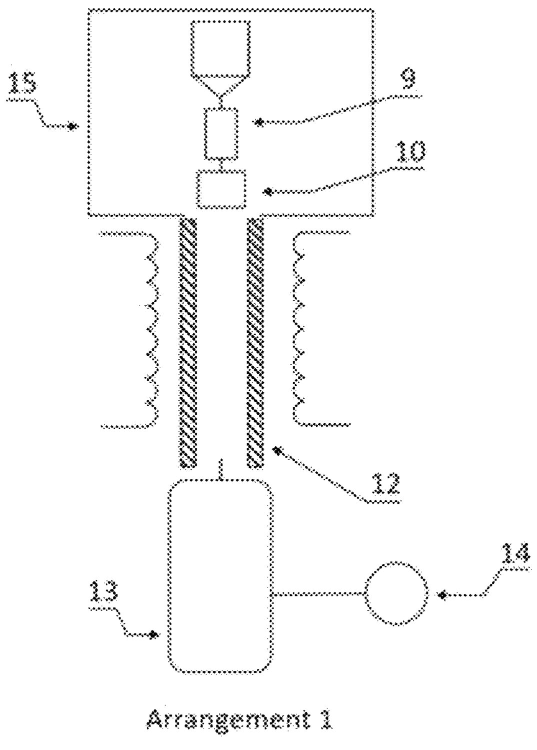
FIG. 3 shows a schematic diagram of the spheroidization of thermoplastic powder using the free fall technique and the mechanism of drawing of the powder and of the shielding gas into the reactor by partial vacuum.

The purpose of the present invention is a method of increasing the sphericity of the powder grains of thermoplastic polymers, characterized by a reduced temperature of the gas carrying the powder grains, reduced high temperature exposure time of the powder, reduced the extent of thermal degradation of the polymer being spheroidized, and increased the achievable yield and throughput of the process.

The essence of the invention is to increase the sphericity of the thermoplastic polymer powder grains by using a device based on a radiation heat transport mechanism for controlled melting of the polymer grains or controlled type-II phase transition, subsequent spontaneous spheroidization and finally the controlled crystallization in a shield gas, where the temperature of the shield gas carrying the polymer powder grains is lower than the melting temperature of the thermoplastic polymer grains.

The method of increasing the sphericity of the grains of thermoplastic polymer powders according to the present invention is based on the introduction of the thermoplastic polymer powder in a gas stream into a device that ensures the breakdown of agglomerates of grains of powder material, then the powder is transported through a nozzle (2) to an optically transparent flow chamber (4) located in the area of radiation generated by a radiation source (3), then the powder absorbs the radiation which leads to its complete melting or a type-II phase transition, then the melted grains are removed from the radiation area by being carried in the carrier gas fed continuously through a pneumatic connection (5); while being carried by the carrier gas, spontaneous spheroidization of the liquid polymer occurs, then the polymer is allowed to crystallize in the carrier gas in a controlled crystallization chamber (7).

The method of increasing the sphericity of grains of thermoplastic polymer powders according to the present invention is characterized by a sequence of steps, where the thermoplastic polymer powder is introduced into a device that ensures the breakdown of agglomerates of grains of powder (9), then the powder is introduced into a device which ensures the conditions close to a free fall of particles and separates the shield gas from the powder suspended in the carrier gas (10), then the powder suspension in the gas and the shielding gas are transported to the optically transparent flow chamber (12) by lowering the pressure in the flow chamber with the use of a reduced pressure generator (14), then the radiation absorption or radiation absorption along with convective heat transfer from the walls of the flow chamber takes place, then full or partial melting of grains or full or partial type-II phase transition takes place, caused by the absorption of energy, then the melted grains are removed from the radiation area by being carried in a gas drawn into the flow reactor from the chamber (15) by the action of the reduced pressure generator (14), then the spontaneous spheroidization of the liquid polymer grains occurs during transportation in the carrier gas, then the controlled crystallization takes place in the carrier gas, in the controlled crystallization chamber (13).

The thermoplastic polymer powder has a melting point or a type-II phase transition temperature range that is always less than the onset thermal decomposition temperature of the polymer in question, in particular the polymer powder is based on polyamide-4, polyamide-6, polyamide-7, polyamide-8, polyamide-9, polyamide-11, polyamide-12, polyamide-46, polyamide-66, polyamide-69, polyamide-510, polyamide-610, polyamide-613, polyamide-1010, polyamide-1012, polyamide-1212, polyamide-1313, polyamide-6T, polyamide-6/66, polyamide-6/12, polyamide-612, as well as copolymers of the said polyamides, polypropylene (PP), low density polyethylene (LDPE), high-density polyethylene (HDPE), low-density branched polyethylene (LL-DPE), copolymers of polypropylene and polyethylene (PP-PE), poly[(ethylene)-co-(vinyl acetate)](EVA), polyethylene waxes (low-molecular-weight polyethylene), paraffin waxes with a melting point below 70° C., ultra-high-molecular-weight polyethylene (UHDPE), poly(butylene terephthalate) (PBT), polyetheretherketone (PEEK), poly(oxymethylene) (POM), thermoplastic polyurethane elastomer (TPU), isotactic polystyrene, atactic polystyrene, poly(methyl methacrylate) isotactic, poly(methyl methacrylate) atactic, thermoplastic polyester elastomers (TPE), and thermoplastic polyamide elastomers (TPA).

Advantageously, the thermoplastic polymer powder contains as an additive a radiation absorbing agent dispersed in the volume of the polymer grains or on the surface of the polymer grains in an amount of 0.01%-10% by weight; advantageously the thermoplastic polymer powder contains the addition of a radiation absorbing agent dispersed homogeneously in the volume of the grains in an amount of 0.01%-2% by weight.

Advantageously, the radiation-absorbing additive is a pigment based on carbon black, carbon fiber of length less than 0.2 mm, carbon nanotubes, fullerene-C60, magnetite ($Fe_3O_4$), hematite ($Fe_2O_3$), black iron(II) oxide (FeO), copper(II) oxide (CuO), ultramarine, pigment based on cobalt(II, III) ($Co_3O_4$), copper phthalocyanine Blue BN (CAS 147-14-8), cobalt blue (Thenard Blue, $CoAl_2O_4$), polyaniline (CAS 25233-30-1), nigrosine or a mixture of the above; advantageously the infrared absorbing additive is a pigment based on carbon black or magnetite.

The device that ensures the breakdown of agglomerates of grains of thermoplastic polymer powder is a Venturi ejector (1) the suction part of which is connected by a hydraulic line (6) to the reservoir of the thermoplastic polymer powder.

The device that ensures the breakdown of powder grain agglomerates according to the invention (9) is a device consisting of a screw feeder and a sieve, subjected to mechanical vibration and/or oscillation.

The device that ensures the breaking up of powder grain agglomerates according to the invention (9) is a device consisting of a screw feeder and a mechanical impacting element, that is subjected to mechanical vibrations and/or oscillations.

Advantageously, the element that ensures the conditions close to a free fall of powder grains and that separates the shielding gas from the powder suspended in the carrier gas (10) is a perforated element.

Advantageously, the carrier gas (8) is at the same time a shielding gas in which controlled crystallization takes place and is a substance or element of the group: air, nitrogen, argon, helium, carbon dioxide, sulfur hexafluoride, or mixtures of the above, advantageously it is nitrogen, argon or sulfur hexafluoride.

Advantageously, the carrier gas (8) has a temperature which is below the melting point or the type-II phase transition temperature of the thermoplastic polymer powder but not lower than 25° C., advantageously the carrier gas is fed at a temperature which is from 20 to 50° C. below the melting point or the type-II phase transition temperature of the thermoplastic polymer powder.

Advantageously, the carrier gas and the powder suspended in the carrier gas are introduced into the reactor as a result of reduced pressure present in the reactor The reduced pressure in the reactor is generated by means of a vacuum pump or a Venturi ejector; advantageously it is generated by means of a vacuum pump.

The radiation source is a filament-based infrared radiation emitter.

The radiation source is a laser.

Advantageously, the filament of the infrared radiation emitter is heated to a temperature in the range of 600-2500° C.; advantageously the filament of the infrared radiation emitter is heated to a temperature of 2200° C. +/−100° C., causing the emission of a radiation spectrum with a maximum spectral irradiance per wavelength in the range of 1.0 to 1.4 um.

Advantageously, the ratio of the nominal power of the filament infrared radiation emitter to the cross-sectional area of the transparent chamber illuminated by the said emitter is in the range of 6.7 kW/m2 to 670 kW/m2; advantageously in the range of 10-100 kW/m2.

Advantageously, the the wavelength of radiation emitted by the laser is any of the following: 0.01 mm ($CO_2$ laser), 0.001064 mm (Nd-YAG laser), 0.001319 mm (Nd-YAG laser), 0.0008 mm (NIR diode laser), 0.00045 mm (blue diode laser)

Advantageously, the radiation source is directed perpendicularly to the direction of powder flow while in the optically transparent chamber, and the radiation path crosses consecutively: the wall of the optically transparent chamber, the interior of the optically transparent chamber filled with polymer powder suspended in the flowing carrier gas, the opposite wall of the optically transparent chamber.

Advantageously, the radiation source is directed perpendicularly to the direction of the powder flow while in the optically transparent chamber, and the radiation path crosses consecutively: the wall of the optically transparent chamber, the interior of the optically transparent chamber filled with polymer powder suspended in the flowing carrier gas, the wall of the optically transparent chamber and a layer of metallic mirror reflecting the radiation into the interior of the optically transparent chamber.

Advantageously, the radiation source is directed perpendicularly to the direction of powder flow while in the optically transparent chamber, and the radiation path crosses consecutively: the wall of the optically transparent chamber, the interior of the transparent chamber filled with polymer powder suspended in the flowing carrier gas, the wall of the transparent chamber and the parallel radiation source.

Advantageously, the optically transparent chamber is made of borosilicate glass, sodium glass, lead glass or fused quartz characterized by an average transmittance determined for a sample of thickness 2 mm of more than 90% in the wavelength range of radiation from 0.001 mm to 0.0025 mm; advantageously the chamber is made from fused quartz characterized by an average transmittance determined for a sample of thickness 2 mm with a value above 90% in the range of radiation wavelength from 0.001 mm to 0.0025 mm, most advantageously it is made from fused quartz known commercially as JGS-2 or JGS-3.

Advantageously, the controlled crystallization is carried out in a shielding gas having a temperature in the range from 25° C. up to a temperature which is 20° C. below the melting point or a type-II phase transition temperature of the polymer powder; advantageously the controlled crystallization is carried out in argon, nitrogen or sulfur hexafluoride, having a temperature from 25° C. to a temperature of 50° C. below the melting point or a type-II phase transition temperature of the polymer powder.

The advantage of the solution according to the invention is the use of a radiation heat transport mechanism to carry out controlled melting of the thermoplastic polymer powder undergoing spheroidization. This invention features the use of a shielding gas temperature that is below the melting point of the polymer being spheroidized, thereby minimizing the risk of thermal degradation of the thermoplastic polymer. In addition, this solution allows the control over the exact location in the flow chamber where the grains of the thermoplastic polymer are expected to melt. This solution mitigates the problem of molten grains adhering to the walls of the flow chamber, known to be present in systems where the shielding gas has a temperature above the melting point of the thermoplastic polymer grains.

Example 1) Powder material based on polyamide 12 with D90<0.130 mm and a number-average circularity parameter of 0.70 and a number-average roundness parameter of 0.65 was fed at 100° C. in air into the reactor. The powder material was introduced into a transparent flow chamber made of borosilicate glass, with a circular cross-section, 35 mm in diameter, 1 mm wall thickness and 300 mm length. The powder material was introduced at a rate of 0.03 kg/h. The example used a filament infrared emitter with a nominal power-to-irradiated-area ratio of 66 kW/m2 and an aluminum reflection layer conformal with the surface of an optically transparent chamber on the side opposite to the radiation source, to reflect unabsorbed radiation back into the transparent chamber. The powder was introduced through a flat nozzle with a variable cross-sectional area, the detailed geometry of which is not the subject of this application and is not reported here. Controlled crystallization was carried out in air at room temperature. The obtained material was subjected to size distribution analysis and shape analysis using a microscopic image analysis method, where the polymer material was analyzed in suspension in a liquid to avoid the formation of agglomerates that could interfere with the measurement. The resulting powder material after spheroidization was characterized by a particle diameter of D90<0.145 mm and a number-average circularity coefficient of 0.79 and a number-average roundness parameter of 0.75. The results indicate an improvement in the overall sphericity of the powder by assuming an average grain shape that is more spherical and more regular than the feed material.

Example 2) A powder material based on polyamide 12 with 090<0.130 mm and a number-average circularity of 0.70 and a number-average roundness of 0.65 was fed at 150° C. in air into the reactor. The powder material was introduced into a transparent flow chamber made of quartz glass known commercially as JGS-2, with a geometry having a circular cross section, with an inner diameter of 40 mm, a wall thickness of 3 mm and a length of 300 mm. The powder material was introduced at a rate of 0.03 kg/h. The example used a filament infrared emitter with a nominal power-to-irradiated-area ratio of 66 kW/m2 and an aluminum reflective layer conformal with the surface of the optically transparent chamber on the side opposite the radiation source to reflect unabsorbed radiation back into the transparent chamber. The powder was introduced through a flat nozzle with a variable cross-sectional area, the detailed geometry of which is not the subject of this application and is not reported here. Controlled crystallization was carried out in air at room temperature. The obtained material was subjected to granulometric distribution analysis and shape analysis using the microscopic image analysis method, where the polymer material was analyzed in suspension in a liquid to avoid the formation of agglomerates that could interfere with the measurement. The powder material obtained was characterized by a particle diameter of D90<151 um and a number-average circularity parameter of 0.81, and a number-average roundness coefficient of 0.79. The results indicate an improvement in the overall sphericity of the powder by assuming an average grain shape that is more spherical and more regular than the feed material.

Example 3) The powder material based on polyamide-12 with D90=0.146 mm and a number average circularity of 0.62 and roundness of 0.55 was fed into the reactor at 100° C. in air. The powder material was introduced into a transparent flow chamber made of fused quartz known commercially as JGS-2, with a circular cross section geometry, with an inner diameter of 17 mm, a wall thickness of 1.5 mm and a height of 300 mm. The powder material was introduced at a rate of 0.002 kg/h. The present example used a filament-based infrared emitter with a nominal power-to-irradiated-area ratio of 70 kW/m2 and a gold reflective layer coherent with the surface of the optically transparent chamber, positioned on the side opposite to the radiation source, to reflect unabsorbed radiation back into the transparent chamber. The powder was fed through a screw feeder integrated with a vibrating-oscillating screen feeder, and then directed into a perforated element which ensured the conditions close to a free fall of powder grains and which separated the shielding gas from the powder suspended in the carrier gas. Controlled crystallization was carried out in air at 70° C. The obtained material was subjected to particle size distribution analysis and shape analysis using a microscopic image analysis method, where the polymer material was analysed suspended in a non-solvent in order to avoid the formation of agglomerates that could interfere with the measurement. The resulting powder material was characterized—after spheroidization by the method described in the example—by a particle diameter of D90=167 um and a number-average circularity parameter of 0.91, and a number-average roundness coefficient of 0.81. The results indicate an improvement in the overall sphericity of the powder, and the shift towards an average grain shape that is more spherical and more regular than the feedstock.

Example 4) The powder material based on polypropylene with D90=0.125 mm and a number average circularity of 0.68 and roundness of 0.63 was fed into the reactor at 100° C. in air. The powder material was introduced into a transparent flow chamber made of fused quartz known commercially as JGS-2, with a circular cross section geometry, with an inner diameter of 17 mm, a wall thickness of 1.5 mm and a height of 300 mm. The powder material was introduced at a rate of 0.0015 kg/h. The present example used a filament-based infrared emitter with a nominal power-to-irradiated-area ratio of 70 kW/m2 and a gold reflective layer coherent with the surface of the optically transparent chamber, positioned on the side opposite to the radiation source, to reflect unabsorbed radiation back into the transparent chamber. The powder was fed through a screw feeder integrated with a vibrating-oscillating screen feeder, and then directed into a perforated element which ensured the conditions close to a free fall of powder grains and which separated the shielding gas from the powder suspended in the carrier gas. Controlled crystallization was carried out in air at 70° C. The obtained material was subjected to particle size distribution analysis and shape analysis using a microscopic image analysis method, where the polymer material was analysed suspended in a non-solvent in order to avoid the formation of agglomerates that could interfere with the measurement. The resulting powder material was characterized—after spheroidization by the method described in the example—by a particle diameter of D90=160 um and a number-average circularity parameter of 0.89, and a number-average roundness coefficient of 0.85. The results indicate an improvement in the overall sphericity of the powder, and the shift towards an average grain shape that is more spherical and more regular than the feedstock.

Example 5) The powder material based on thermoplastic polyurethane (TPU) with D90=0.143 mm and a number-average circularity of 0.82 and roundness of 0.62 was fed into the reactor at 100° C. in air. The powder material was introduced into a transparent flow chamber made of fused quartz known commercially as JGS-2, with a circular cross section geometry, with an inner diameter of 17 mm, a wall thickness of 1.5 mm and a height of 300 mm. The powder material was introduced at a rate of 0.0027 kg/h. The present example used a filament-based infrared emitter with a nominal power-to-irradiated-area ratio of 70 kW/m2 and a gold reflective layer coherent with the surface of the optically transparent chamber, positioned on the side opposite to the radiation source, to reflect unabsorbed radiation back into the transparent chamber. The powder was fed through a screw feeder integrated with a vibrating-oscillating screen feeder, and then directed into a perforated element which ensured the conditions close to the free fall of powder grains and which separated the shielding gas from the powder suspended in the carrier gas. Controlled crystallization was carried out in air at 70° C. The obtained material was subjected to particle size distribution analysis and shape analysis using a microscopic image analysis method, where the polymer material was analysed suspended in a non-solvent in order to avoid the formation of agglomerates that could interfere with the measurement. The resulting powder material was characterized—after spheroidization by the method described in the example—by a particle diameter of D90=152 um and a number-average circularity parameter of 0.90, and a number-average roundness coefficient of 0.93. The results indicate an improvement in the overall sphericity of the powder, and the shift towards an average grain shape that is more spherical and more regular than the feedstock.

The invention claimed is:

1. A method of increasing the sphericity of grains of a thermoplastic polymer powders, comprising the consecutive steps a-g of: (a) introduction of the polymer powder into a device that ensures the breakdown of agglomerates of the grains of powder (9), (b) transportation of the deagglomerated powder into a device which ensures a free fall movement of the powder and which separates a shield gas from the powder suspended in a carrier gas (10), (c) transportation of the suspended powder and the shield gas into an optically transparent flow chamber (12) caused by lowering the pressure inside the flow chamber by the action of a reduced pressure generator (14), (d) energy transfer to the powder particles by means of radiation absorption or by means of combined radiation absorption and convective heat transfer from the walls of the flow chamber, (e) full or partial melting or full or partial type-II phase transition of the grains of powder as a result of the energy transfer, (f) removal of the melted grains from the radiation area by the carrier gas drawn into the optically transparent flow reactor from the chamber (15) by the action of the reduced pressure generator (14), while polymer particles undergo spontaneous spheroidization, (g) a process of controlled crystallization of the polymer in the carrier gas, taking place in a controlled crystallization chamber (13).

2. A method according to claim 1, wherein the thermoplastic polymer powder has a melting point or a type-II phase transition temperature range that is always less than the onset thermal decomposition temperature of the polymer in question, wherein the thermoplastic polymer powder is a polymer powder based on polyamide-4, polyamide-6, polyamide-7, polyamide-8, polyamide-9, polyamide-11, polyamide-12, polyamide-46, polyamide-66, polyamide-69, polyamide-510, polyamide-610, polyamide-613, polyamide-1010, polyamide-1012, polyamide-1212, polyamide-1313, polyamide-6T, polyamide-6/66, polyamide-6/12, polyamide-612, as well as copolymers of the said polyamides, polypropylene (PP), low density polyethylene (LOPE), high-density polyethylene (HOPE), low-density branched polyethylene (LLOPE), copolymers of polypropylene and polyethylene (PP-PE), poly[(ethylene)-co-(vinyl acetate)] (EVA), polyethylene waxes (low-molecular-weight polyethylene), paraffin waxes with a melting point below 70° C., ultra-high-molecular-weight polyethylene (UHOPE), poly (butylene terephthalate) (PBT), polyetheretherketone (PEEK), poly (oxymethylene) (POM), thermoplastic polyurethane elastomer (TPU), isotactic polystyrene, atactic polystyrene, poly (methyl methacrylate) isotactic, poly (methyl methacrylate) atactic, thermoplastic polyester elastomers (TPE), thermoplastic polyamide elastomers (TPA), or a combination thereof.

3. A method according to claim 2 wherein the thermoplastic polymer powder contains as an additive a radiation absorbing agent dispersed in the volume of the polymer grains or on the surface of the polymer grains in an amount of 0.01%-10% by weight.

4. A method according to claim 3, wherein the radiation-absorbing additive is a pigment based on carbon black, carbon fiber of length less than 0.2 mm, carbon nanotubes, fullerene-C60, magnetite (Fe3O4), hematite (Fe2O3), black iron (II) oxide (FeO), copper (II) oxide (CuO), ultramarine, pigment based on cobalt (II, III) (Co3O4), copper phthalocyanine Blue BN (CAS 147-14-8), cobalt blue (Thenard Blue, CoAl2O4), polyaniline, nigrosine, or a mixture of the above.

5. A method according to claim 2, wherein the thermoplastic polymer powder does not contain the addition of a radiation absorbing agent, and the radiation absorption is provided by the polymer undergoing spheroidization.

6. A method according to claim 1, wherein the device for ensuring the breaking up of powder agglomerates (9) is a device comprising a screw feeder and a screen mesh subjected to mechanical vibration and/or oscillation.

7. A method according to claim 1, wherein the device for ensuring the breaking up of powder agglomerates (9) is a device comprising a screw feeder and a mechanical impact element subjected to mechanical vibration and/or oscillation.

8. A method according to claim 1, wherein the element providing the free fall movement of the powder grains and separating the shielding gas from the powder suspended in the carrier gas (10) is a perforated element subjected to mechanical vibration.

9. A Method according to claim 1, wherein the carrier gas is fed at a temperature which is below the melting point or the type-II phase transition temperature for the thermoplastic polymer powder, but at the same time not lower than 25° C..

10. A method according to claim 1, wherein the carrier gas (8) has a temperature which is below the melting point or the type-II phase transition temperature of the thermoplastic polymer powder but not lower than 25° C..

11. A method according to claim 1, wherein the radiation source is a filament-based infrared radiation emitter.

12. A method according to claim 1, wherein the radiation source is a laser.

13. A method according to claim 11, wherein the filament of the infrared radiation emitter is heated to a temperature in the range of 600-2500° C..

14. A method according to claim 1, wherein the ratio of the nominal power of the filament infrared radiation emitter to the cross-sectional area of the transparent chamber illuminated by the said emitter is in the range of 1 kW/m2 to 1000 kW/m2.

15. A method according to claim 12, wherein the wavelength of radiation emitted by the laser is 0.01 mm (CO2 laser), 0.001064 mm (Nd-YAG laser), 0.001319 mm (Nd-YAG laser), 0.0008 mm (NIR diode laser), or 0.00045 mm (blue diode laser).

16. A method according to claim 1, wherein the radiation source is directed perpendicularly to the direction of powder flow while in the optically transparent chamber, and the radiation path crosses consecutively: the wall of the optically transparent chamber, the interior of the optically transparent chamber filled with polymer powder suspended in the flowing carrier gas, and the opposite wall of the optically transparent chamber.

17. A method according to claim 1, wherein the radiation source is directed perpendicularly to the direction of the powder flow while in the optically transparent chamber, and the radiation path crosses consecutively: the wall of the optically transparent chamber, the interior of the optically transparent chamber filled with polymer powder suspended in the flowing carrier gas, the wall of the optically transparent chamber, and a layer of metallic mirror reflecting the radiation into the interior of the optically transparent chamber.

18. A method according to claim 1, wherein the radiation source is directed perpendicularly to the direction of powder flow while in the optically transparent chamber, and the radiation path crosses consecutively: the wall of the optically transparent chamber, the interior of the transparent chamber filled with polymer powder suspended in the flowing carrier gas, the wall of the transparent chamber, and the parallel radiation source.

19. A method according to claim 1, wherein the radiation source is directed perpendicularly to the direction of powder flow while in the optically transparent chamber, and the radiation path crosses consecutively: the wall of the optically transparent chamber, the interior of the transparent chamber filled with polymer powder suspended in the flowing carrier gas, and a layer of metallic mirror reflecting the radiation into the interior of the optically transparent chamber.

20. A method according to claim 1, wherein the optically transparent chamber is made of borosilicate glass, sodium glass, lead glass, or fused quartz characterized by an average transmittance determined for a sample of thickness 2 mm of more than 90% in the wavelength range of radiation from 0.001 mm to 0.0025 mm.

21. A method according to claim 1, wherein the controlled crystallization is carried out in the shield gas having a temperature in the range from 25° C. up to a temperature which is 20° C. below the melting point or a type-II phase transition temperature of the polymer powder.

22. A method according to claim 1, wherein the shield gas and the powder suspended in the carrier gas are introduced into the reactor by the action of reduced pressure inside the reactor, where the reduced pressure is generated by means of a vacuum pump or a Venturi ejector.

* * * * *